United States Patent [19]

Tanaka et al.

[11] 3,869,764

[45] Mar. 11, 1975

[54] PRESS-ON AND SPLIT-OFF TYPE FASTENER AND MANUFACTURING DEVICE THEREFOR

[75] Inventor : Hideo Umezu, Tokyo, Japan

[73] Assignee: International Fastener Establishment, Vaduz, Liechtenstein

[22] Filed: Feb. 28, 1974

[21] Appl. No.: 446,769

Related U.S. Application Data

[63] Continuation of Ser. No. 230,254, Feb. 29, 1972, abandoned.

[52] U.S. Cl. .................................................. 24/204
[51] Int. Cl. ............................................ A44b 17/00
[58] Field of Search ....................................... 24/204

[56] References Cited
UNITED STATES PATENTS

| 3,102,314 | 9/1963 | Alderfer | 24/204 |
|---|---|---|---|
| 3,266,113 | 8/1966 | Flanagan | 24/204 |
| 3,312,583 | 4/1967 | Rochlis | 24/204 |
| 3,325,084 | 6/1967 | Ausnit | 24/204 |
| 3,557,413 | 1/1971 | Engle | 24/204 |
| 3,808,648 | 5/1974 | Billarant et al. | 24/204 |

Primary Examiner—Roy D. Frazier
Assistant Examiner—Darrell Marquette
Attorney, Agent, or Firm—Ryder, McAulay, Fields, Fisher & Goldstein

[57] ABSTRACT

A press-on and split-off type fastener is constructed of a plurality of corrugated strips of fixed width having alternate uniformly-shaped curved ridges and flat portions of uniform length by arranging such strips in parallel with a fixed phasal relationship between the strips so as to form a protruding type joining surface on one side and a hollow type joining surface on the other side. Closure is possible either between two protruding type joining surfaces or between a protruding type joining surface and a hollow type joining surface and the hollow type joining surface presents a flat surface by which the fastener can be attached to other materials.

11 Claims, 22 Drawing Figures

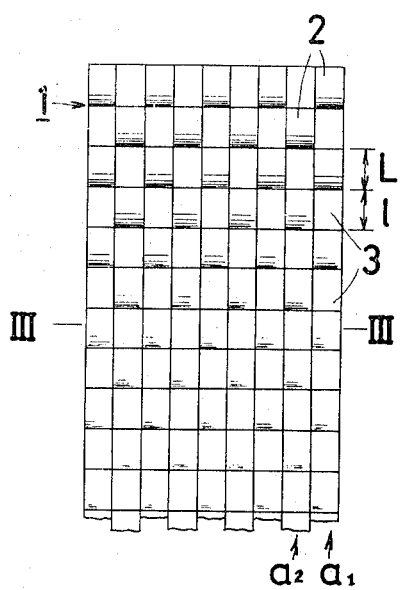
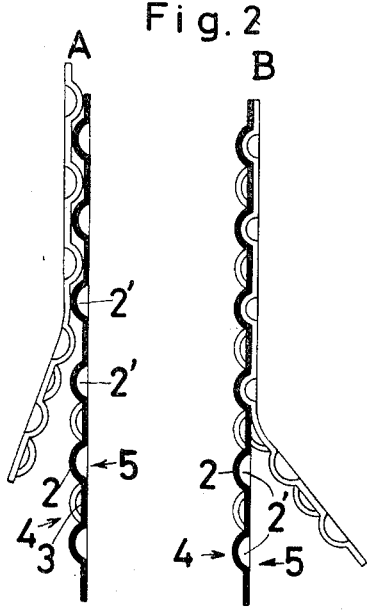
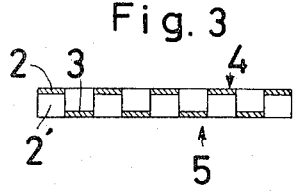
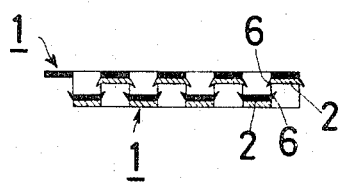
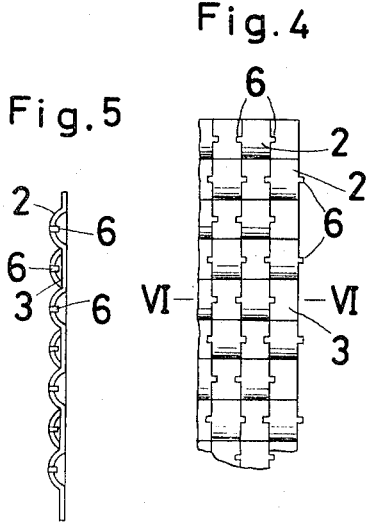

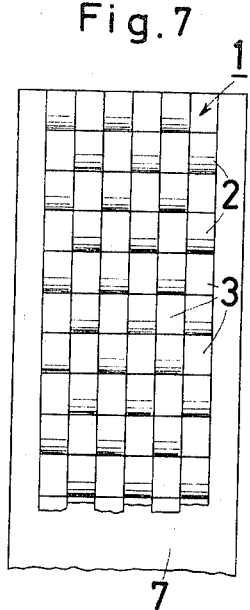
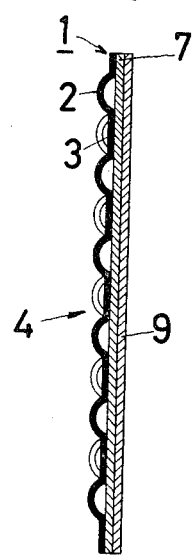
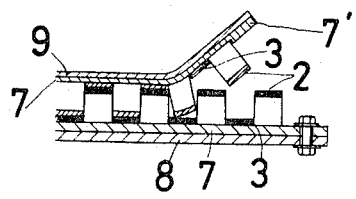
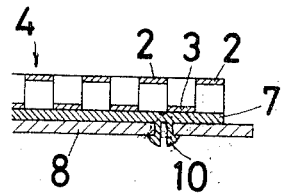
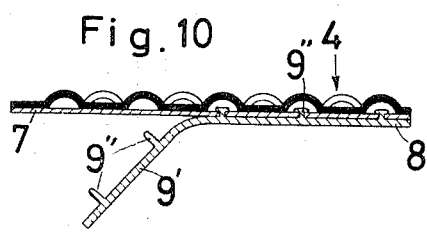
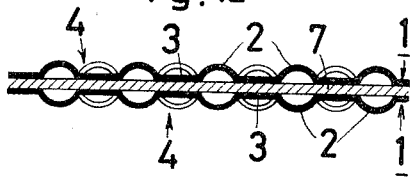

PRESS-ON AND SPLIT-OFF TYPE FASTENER AND MANUFACTURING DEVICE THEREFOR

This is a continuation of application Ser. No. 230,254, filed Feb. 29, 1972, now abandoned.

This invention relates to a press-on and split-off type fastener made of a strip, one face of which is provided with uniformly-shaped curved ridges forming a corrugated protruding type joining surface and the other surface of which is substantially flat and to a manufacturing device for this type of fastener.

A fastener formed of a strip on both faces of which protrude uniformly-shaped curved ridges constituting corrugated protruding type joining surfaces is presently under patent application by one of the present inventors. However, in attaching this fastener to another material such as a panel, since both faces are corrugated, it is necessary to fix the other material on the points presented by the ridge heads, and so, disadvantageously, it is impossible to realize a firm adherence between the fastener and the other material.

Therefore, an object of this invention is to provide a fastener which can be fixed firmly and securely on other materials by virtue of the flat face.

Another object of this invention is to make it possible to make a closure by placing the said plain face on the protruding joining surface in case the fastener is not fixed to other materials by the above-mentioned flat face.

Another object of this invention is to make it easy to fix the fastener on other materials through the use of a supporting strip or by means of a clip attached to the supporting strip on which the flat face is held.

Still another object of this invention is to improve the closing force by the above-mentioned supporting strip and also to prevent the fastener from tearing at the connection points between the adjacent parallel corrugated units on splitting-off.

A further object of this invention is to provide a rolling die, simply in structure, which can produce a corrugated face, formed of curved ridges having the shape described above, on a sheet-like strip.

The above-mentioned objects as well as other objects of this invention will be made apparent by the following description of the embodiments represented in the drawing. The same reference numerals are used to indicate similar structural parts throughout the figures.

FIG. 1 is a front view of one typical embodiment of the fastener according to the present invention;

FIG. 2 is a side view of the fastener shown in FIG. 1;

FIG. 3 is a sectional view along line III — III of the fastener shown in FIG. 1;

FIG. 4 is a front view of another embodiment of the fastener according to the present invention;

FIG. 5 is a side view of the fastener shown in FIG. 4;

FIG. 6 is a sectional view along line VI — VI of the fastener shown in FIG. 4;

FIG. 7 is a front view of another embodiment of the fastener which is backed with a supporting strip;

FIG. 8 is a sectional view along line VIII — VIII of the fastener shown in FIG. 7;

FIG. 9 is a sectional view showing the fastener of FIG. 7 in partial closure with the fastener of another embodiment;

FIG. 10 – FIG. 12 are sectional views of other embodiment of the fastener according to the present invention;

Figure 13:
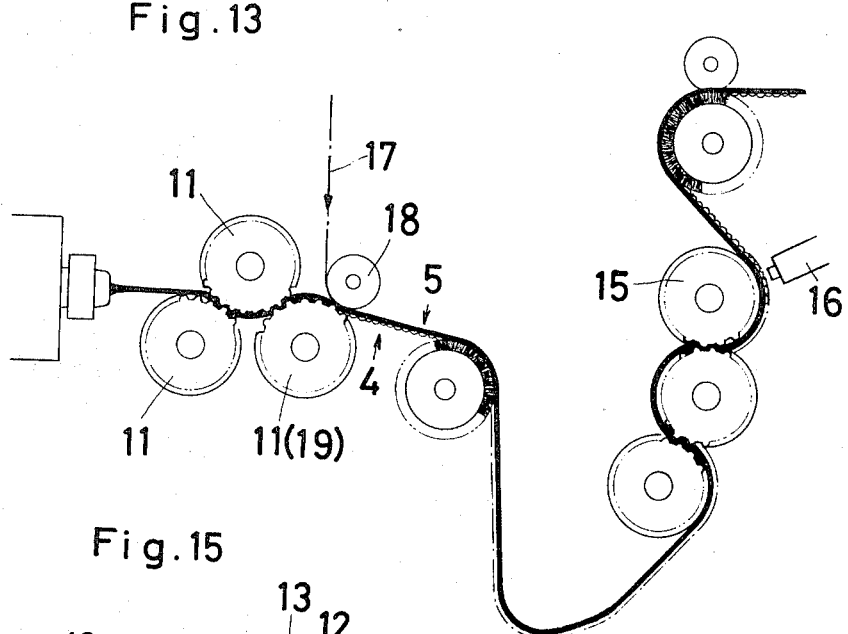
FIG. 13 is a diagram illustrating a device for manufacturing the fastener according to the present invention.

Referring to FIGS. 1, 2 and 3, the fastener strip 1 is formed by a plurality of corrugations $a_1$, $a_2$ of uniform width, placed in parallel to one another, each of the corrugations being constituted by alternate curved ridges 2 and flat portions 3 of equal length, and any adjacent pair of corrugations such as $a_1$ and $a_2$ for example are arranged throughout their length with a predetermined phase difference so that each curved ridge of $a_1$ is adjacent a flat portion of $a_2$. The length L of the curved ridges and the length $l$ of the flat portions are in general in the relationship L      $l$.

Thus, the fastener strip is comprised of the protruding joining surface 4 formed by the regular zigzag arrangement of the curved ridges. The face on the back side of the protruding joining surface 4 has grooves 2' at the rear of the above-mentioned curved ridges 2 arranged in a fixed regular zigzag manner, and forms a hollow type joining surface 5, the surface of which is formed by the back surface of the aforementioned flat portions.

This fastener can be manufactured by forming the above-mentioned corrugations $a_1$ and $a_2$ . . . on a belt made of plastic material such as nylon, polyvinyl chloride, polypropylene or polyethylene or of other materials, and by then applying these belts face to face in an appropriate manner. However, as will be described hereinafter, the fastener can be formed by passing a sheet-like strip in between mutually engaging dies. In case plastic is used, the dimensions of the corrugated elements can be, for example, thickness: 0.5 mm, width: 1 mm, height of the curved ridges measured from the surface of the flat portion: 1.5 mm, length of the curved ridges and of the flat portions: 3 mm, although the dimensions are not limited to these only.

Accordingly, when one of the above-mentioned fastener strips is folded back on itself so that the protruding type joining surface 4 engages suitably on itself, or when two of said strips are placed in such a way that the protruding type joining surfaces 4 engage each other face to face, the curved ridges of each surface being pressed into the flat portions of the other so that each ridge is surrounded by four ridges on the other surface, the closing is performed by virtue of the mutual friction between the curved ridges (FIG. 2(A)). When the fastener is closed in this relationship, in order to provide self-reinforcement of the closure of the so disposed fastener, a projection 6 inclined downward and protruding outward is provided on the top of each of the curved ridges. When a ridge is inserted into a flat portion, its projections bend as they pass between the surrounding curved ridges and then return to their original position after full engagement, so that the closing force at the said flat portion is directed oppositely to the closing force at the adjacent ridges of the neighboring corrugations (FIG. 6). In this case, it is better to use an equal length for the grooves and ridges, so that the ridge tops of each corrugation are aligned with the centers of the flat portions on the adjacent corrugations.

Moreover, this fastener can be closed by applying a hollow type joining surface 5 on a protruding type joining surface 4 and by pushing the protruding ridges of the latter surface into the exposed hollow grooves of the hollow type joining surface (FIG. 2(B)).

In this case, the closing force is provided by the friction between the side faces of the ridges and those of the pair of flat portions surrounding each ridge.

Thus, thanks to the flat surfaces of the exposed flat portion of the hollow type joining surface, this fastener can be fixed firmly on other materials and, when not fixed on other material, can be closed in either of two ways. Splitting off can be accomplished by applying a force superior to and in the opposite direction of the closing force.

If from the point of obtaining a firmer and easier closure it is considered more advantageous to join the fastener to another material by utilizing the flat surface of the hollow type joining surface than to form the closure by applying the hollow type joining surface 5 on the protruding joining surface 4, said hollow type joining surface 5 can be fixed to a supporting strip 7 by means of the flat surface as in the fastener of FIG. 7.

If the supporting strip 7 and the fastener strip 1 are made either of the same or of different plastic materials which can adhere to each other, they can be bonded together by fusion or by the use of an adhesive.

In this way, the supporting strip 7 prevents the elongation of the fastener strip along the corrugations and the widening of the intervals between the corrugations. It improves greatly the closing force in the case where a closure is made by folding the protruding type joining surface back on itself and also considerably reinforces the adhesion between neighboring corrugations. Moreover, it almost totally eliminates the tearing of the strip along the junction between adjoining corrugations when the fastener is split off from the closed state.

The aforementioned supporting strip 7 can be as thin as a film, or it can be a sufficiently flexible sheet not as thin as a film, or a hard plate or block. In case the supporting strip 7 is thin, it is better for the supporting strip 7 to protrude outward from both ends of the fastener strip as shown in FIG. 9. The above-mentioned protrusions of the supporting strip 7 are preferably made thick in order to prevent the supporting strip 7 from being torn off at the edge. The said thick parts 7' can furthermore serve as tabs for pulling away the fastener during splitting-off.

In case the supporting material is a plate of a block, by making the plate or block protrude outward on both sides of the strip, the protrusions can serve to fix the strip to another material 8 such as a panel by means of a nail or a screw (FIG. 9). If the panel holding the fastener or a suitable material 8 on which it is desired to fix the fastener and the supporting strip 7 are made of the same or of different plastic materials which can adhere to each other, the bonding can be made by fusion or by applying an adhesive on the back of the supporting strip 7 and on the fixing face of the material 8. Moreover, if in this case, the said supporting strip 7 is made of polyethylene or of polypropylene for which no suitable bonding method is available at present, either an adhering layer 9 is made or a bonding device 10 is fixed on the back of the supporting strip 7.

The above-mentioned adhering layer 9 can be made by applying on the back of the supporting strip 7 an adhesive tape having both faces provided with adhesive or by sprinkling a layer of melted powdered resin such as nylon or polyvinyl chloride for which bonding method is known onto the back surface of the supporting strip 7 while it is in molten condition. Furthermore, a bondable sheet 9' of nylon or polyvinyl chloride can be made. In this case, a plurality of legs 9'' are firmly formed on one face of said bondable sheet 9' in such a way that the legs 9'' can pierce through the supporting strip 7 and enter the hollow places on the back of the curved ridges of the fastener, so that by pressing the face of the bondable sheet 9' which is provided with legs 9'' onto the back of the supporting strip 7 when the latter is heated, the front ends of the legs entering the hollow back of the fastener ridges are forced into a spherical or an umbrella-like form because of the resistance of the supporting strip 7 met at intrusion, thus contributing to the fixation by virtue of the inability of the legs 9'' to draw backward (FIG. 10).

The bonding device 10 can be fixed by means of a stud clip provided on the back of the supporting strip during the formation of the latter, as shown in FIG. 11. The clip can also be made separately and fixed on the back of the supporting strip by fusion or by adhesion.

The above-mentioned clip can be the usual type of clip which is narrowed during passage through the slot provided on the panel, regaining its dimensions thereafter owing to its elasticity and thus rendering it impossible or difficult to draw back. Or a second strip similar to the strip 1 can be used and fixed to it by means of the flat portions, as shown in FIG. 12.

In order to manufacture plastic strips, plastic belts are formed by extrusion from an extruding machine as shown in FIG. 13, and passed through mutually engaging rolling dies 11 and 11 before hardening in order to create the different corrugations $a_1, a_2 \ldots$, and then wound up into rolls.

Figure 15:
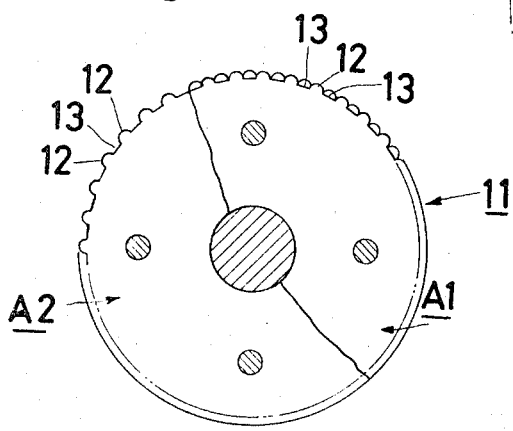
FIG. 15 is a sectional view of the roll shown in FIG. 14.
Figure 14:
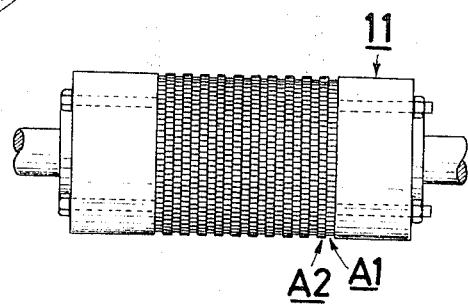
FIG. 14 is a front view of a roll of the first group of rolls of the device shown in FIG. 13.

The outer circumferences of the said rolling dies are provided with teeth 12, destined to form the ridges 2 of the corrugations, disposed alternately with flat intervals or oppositely curved troughs 13 destined to form the flat portions 3. A plurality of toothed wheels $A_1, A_2 \ldots$ having a thickness appropriate to the width of the corrugations are placed side by side on the same shaft, the number of the said wheels being equal to the number of the corrugations, and the neighboring wheels being displaced so that their phases differ by a fixed amount. The die is thus easily produced by assembling the wheels so arranged into an integral body (FIG. 14 and FIG. 15).

Figure 16:
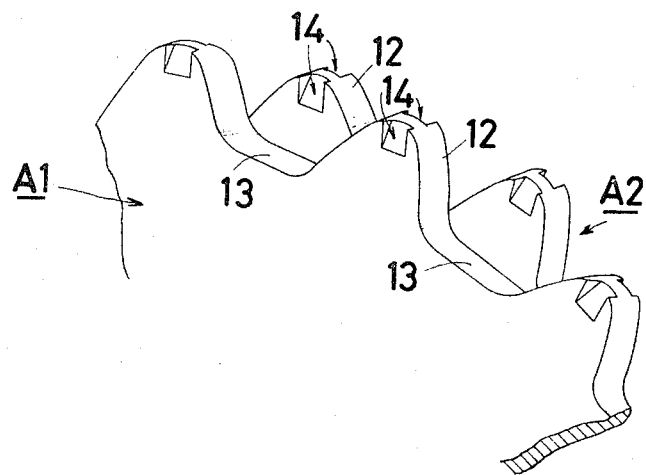
FIG. 16 is an enlarged perspective view of a disc of the roll shown in FIG. 15.
Figure 17:
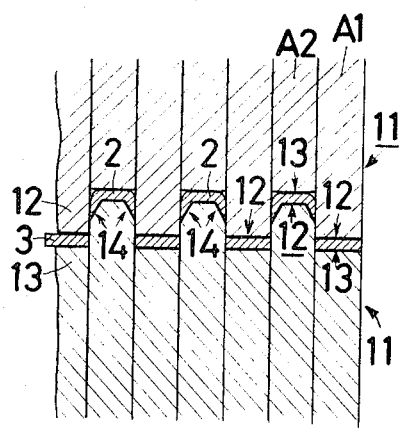
FIG. 17 is an enlarged sectional view of a part of the rolls in the state of engagement.
Figure 18:
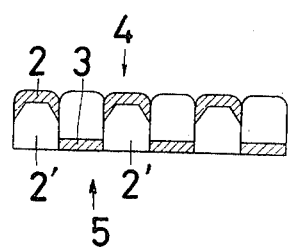
FIG. 18 is an enlarged sectional view of a fastener passing between the first group of rolls.
Figure 19:
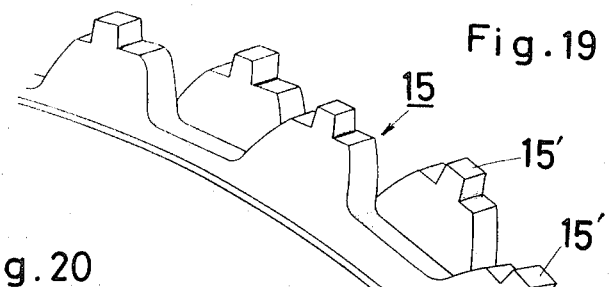
FIG. 19 is an enlarged perspective view of a part of a roll of the second group of the device shown in FIG. 13.
Figure 20:
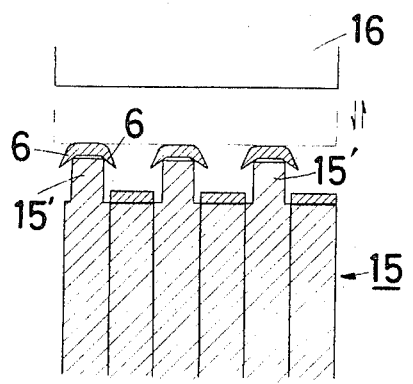
FIG. 20 is a sectional view of the projections in the state of being continuously tapped.
Figure 21:
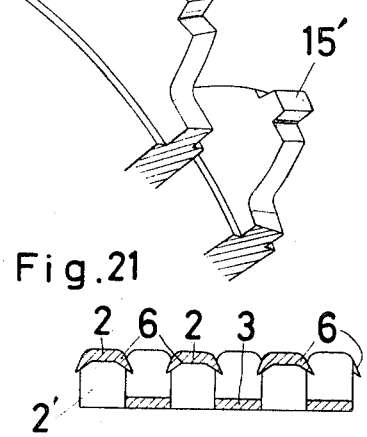
FIG. 21 is an enlarged sectional view of a fastener having projections.

In order to manufacture the type of fastener wherein downwardly inclined protrusion 6 is provided on the top of each curved ridge, a pair of cuts 14 destined to form the right and the left protrusions 6 on the top of each ridge are provided on each tooth 12 of the rolling dies by which the strips are formed by pressure from the side of the hollow type joining surface (FIG. 16). In order to ensure that the projections 6 are formed in a downwardly inclined and outwardly protruding manner, the strips, after passage through the rolling dies, are passed again through rollers 15 having the same shape as that of the above mentioned rolling dies 11 but either not provided with the said cuts 14 or provided with smaller cuts, the teeth 15' of the said rollers 15 supporting the tops of the ridges from inside while the tops themselves are tapped lightly by a vibrator 16.

Figure 22:
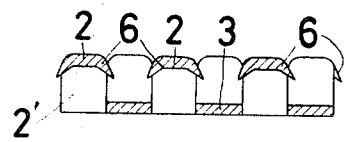
FIG. 22 is a diagram illustrating a device for backing the fastener with a supporting strip.

In case the supporting strip 7 is also formed by the plastic extrusion method, the fastener strip and the supporting strip 7 are passed, while being heated in order to fuse them together, in between a cylindrical roller 18 and a toothed roller 19 having the same form as the above-mentioned rolling die 11, placed in external contact with said roller 18 (FIG. 22). The supporting strip 17 is rolled on the above-mentioned cylindrical roller 18 while the fastener strip passes with its protruding type joining surface 4 engaging the toothed roller 19. In this way the supporting strip is fused upon the hollow type joining surface of the fastener strip.

As shown in FIG. 13, the toothed roller 19 is regarded as the final die in the manufacturing process of the fastener and the fastener strip is fused onto the supporting strip 17 immediately after forming. However, it can also be fused onto the supporting strip after hardening by unwinding it from a roll, and fusing it in place by heating of the hollow type joining surface with a heating device such as heater 20.

In case the supporting strip is made of polyethylene or of polypropylene for which, as mentioned hereinbefore, there is no perfect bonding method at present, powder of nylon or polyvinyl chloride for which a bonding method is known, is sprinkled onto the exposed face of the supporting strip from the powder tank 21 either before or after fusion during heating.

In case the bonding layer is a tape with two adhesive faces, by tearing off the cover on one of the faces, the tape can be applied onto the hollow type joining surface of the fastener or on the exposed surface of the supporting strip attached to the hollow type joining surface. When used the remaining cover is torn off for fixing to the material 8. If it is desired to form a gripping surface on the exposed face of the supporting strip, it is sufficient to make the surface of the above-mentioned cylindrical roller sufficiently rough. In the case of employing clip 10, moreover, if a foaming agent is added to the raw material for producing the supporting strip 7 to make the strip 7 compressible, the elasticity of the strip against the clip 10 will prevent the clip from moving loosely when the strip is fixed to the material 8.

What is claimed is:

1. A press-on, separable fastener comprising:
first and second facing portions, each of said portions having a support member, and a set of adjoining longitudinal parallel strips on said support member, each of said strips providing a series of spaced apart ridges protruding from said support member, each of said strips containing a series of spaces, each of said spaces being two successive ones of said ridges,
within each of said portions, adjoining ones of said strips being longitudinally staggered relative to each other such that said ridges and spaces of adjoining strips are alternately juxtaposed,
the edges of said ridges of said first portion frictionally engaging the edges of said ridges of said second portion when said portions are engaged.

2. The fastener of claim 1 further comprising:
a plurality of projections, each of said projections extending laterally from said ridges of at least said first portion,
projections on the ridges in said first portion underlying the ridges on said second portion when said portions are engaged.

3. The fastener of claim 1 wherein each of said longitudinal parallel strips is laminated to the associated support member.

4. The fastener of claim 3 wherein support members of each of said portions is flexible.

5. The fastener of claim 1 wherein said projections extend out from both edges of ridges on each of said portions.

6. The fastener of claim 2 wherein said projections lie in a direction having a lateral component.

7. The fastener of claim 1 wherein said strips are of equal width.

8. A separable fastener member comprising:
a planar support member,
a sheet of resilient material in the form of an integral field of plural adjoining longitudinal strips on said support member,
the strips undulating in an alternating series of arches and spaces,
said arches protuberant from said support member,
said spaces interposed between said arches,
the adjoining strips being staggered relative to each other such that the arches and spaces of adjoining strips are alternately juxtaposed,
the spaces serving to receive the protuberant arches of a facially superposed substantially identical field, the edges of said arches serving to frictionally engage the edges of the arches of a facially superposed substantially identical field.

9. The separable fastener of claim 8 wherein:
the side edges of at least some of the arches having tabs which project in a direction having a lateral component,
the projecting tabs of each field overlying those of a facially superposed field to resiliently retain the arches of each field in the spaces of the other.

10. The separable fastener of claim 8, wherein said strips are laminated on said support member.

11. The separable fastener of claim 8, wherein said support strip is flexible.

* * * * *

UNITED STATES PATENT OFFICE
CERTIFICATE OF CORRECTION

PATENT NO. : 3,869,764
DATED : March 11, 1975
INVENTOR(S) : Hideo Umezu

It is certified that error appears in the above-identified patent and that said Letters Patent are hereby corrected as shown below:

Col. 2, line 33, " L   1" should read --$L \leq 1$--.

Col. 6, line 3, Claim 1, "being two" should read --being between two--

Signed and sealed this 20th day of May 1975.

(SEAL)
Attest:

RUTH C. MASON
Attesting Officer

C. MARSHALL DANN
Commissioner of Patents
and Trademarks